May 31, 1966 P. C. SORENSON ETAL 3,253,459
MILES PER GALLON METER
Filed Oct. 16, 1961 6 Sheets-Sheet 1
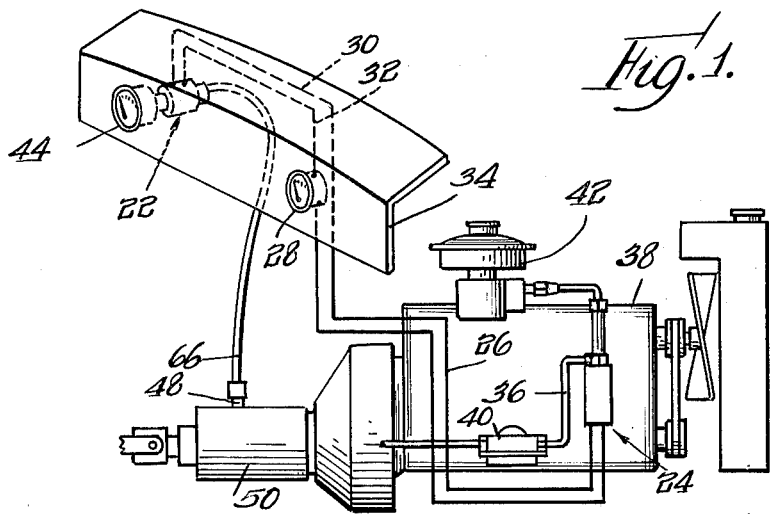
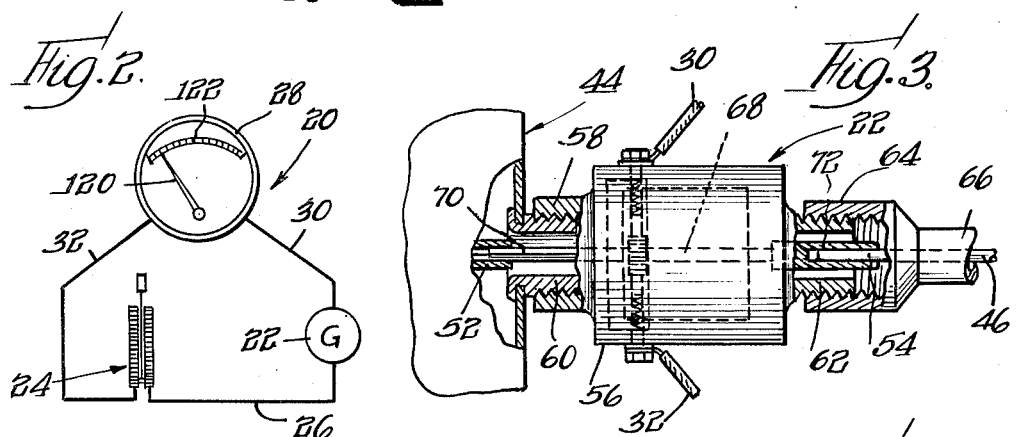
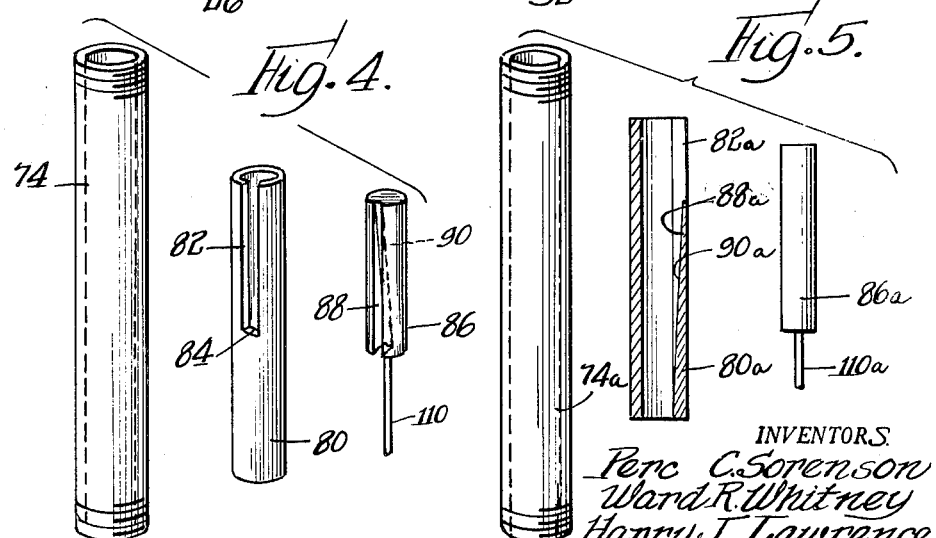
INVENTORS.
Perc C. Sorenson
Ward R. Whitney
Harry J. Lawrence
By: Olson & Trexler attys.

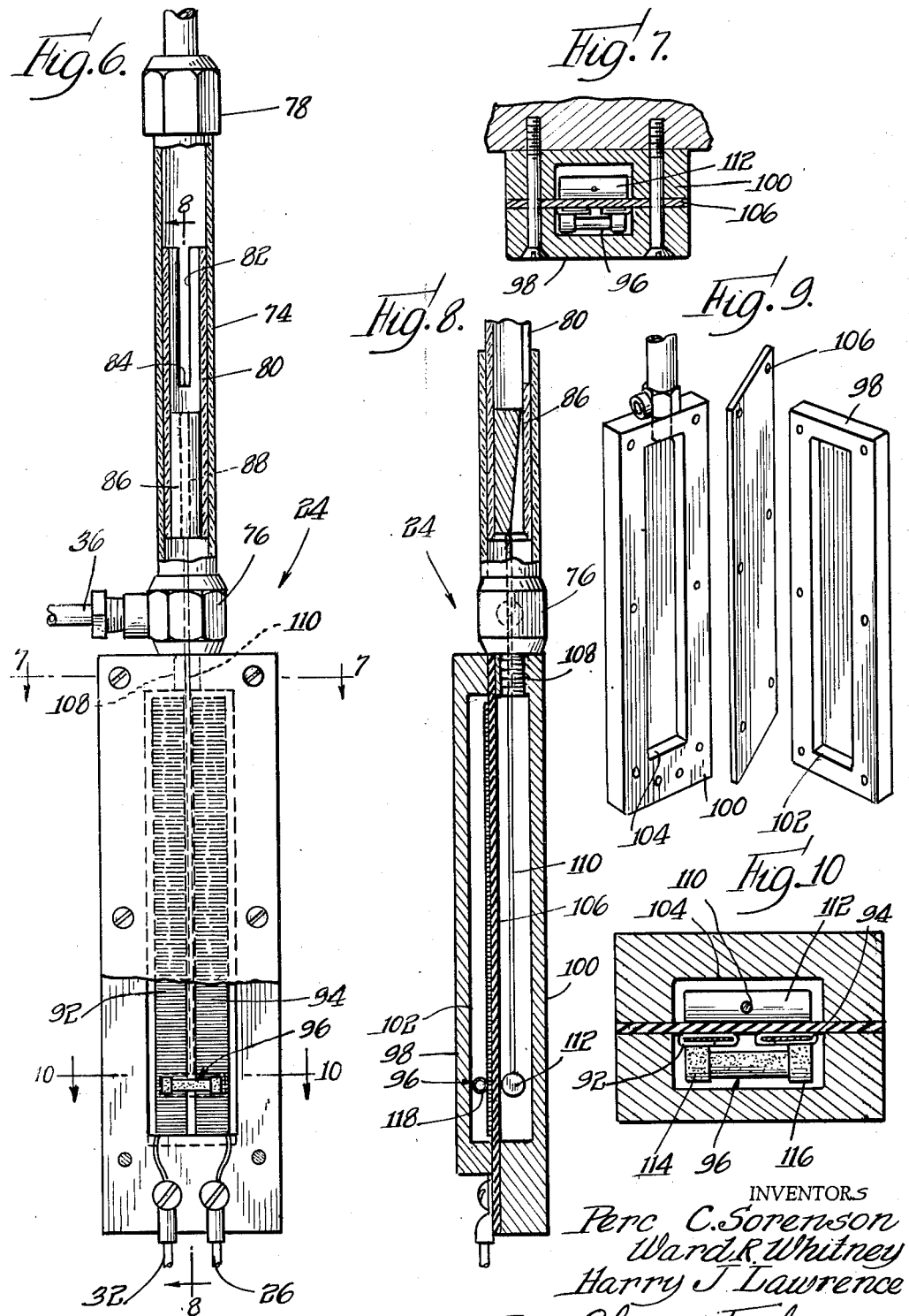

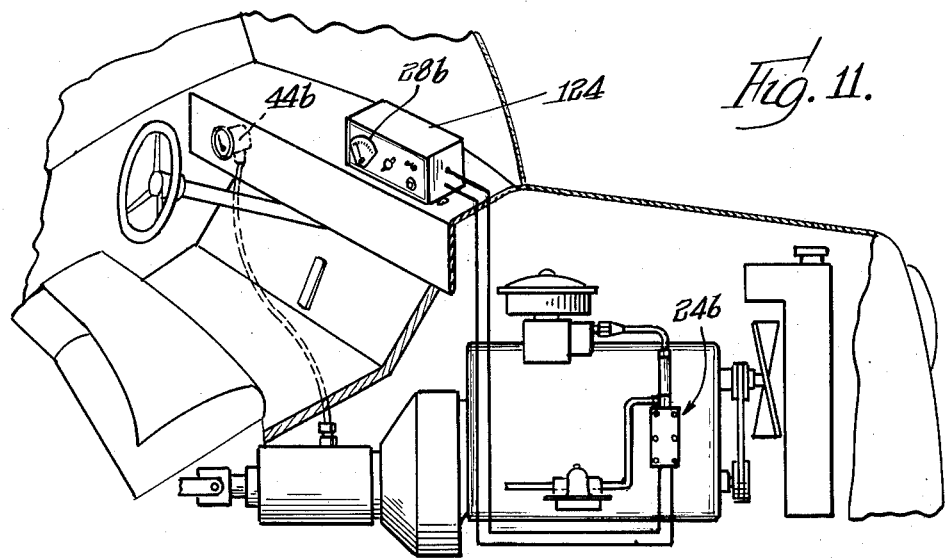
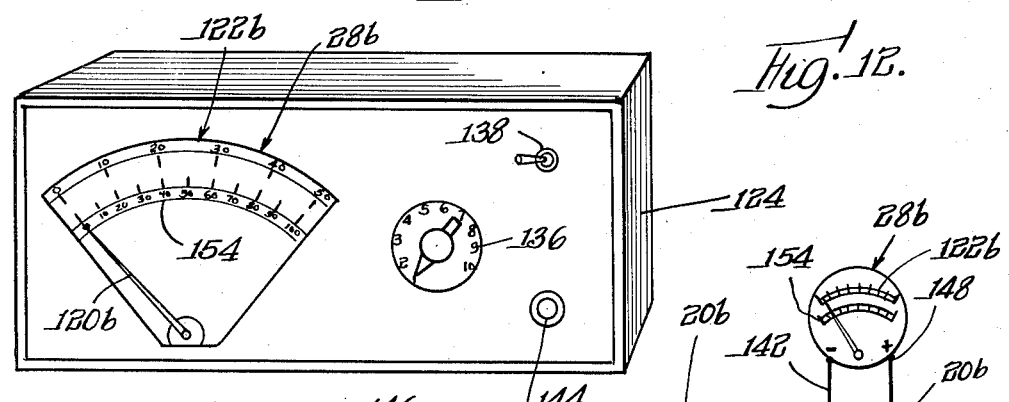
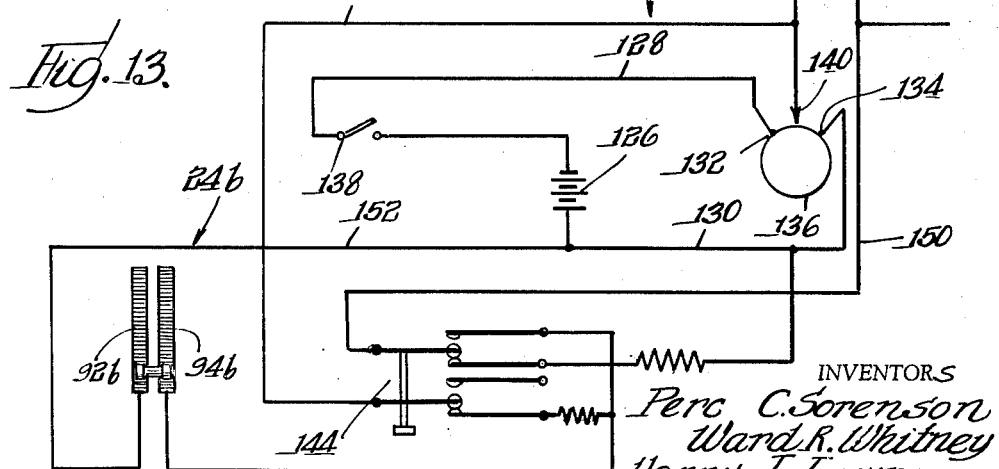
INVENTORS
Perc C. Sorenson
Ward R. Whitney
Harry J. Lawrence
By: Olson & Trexler attys.

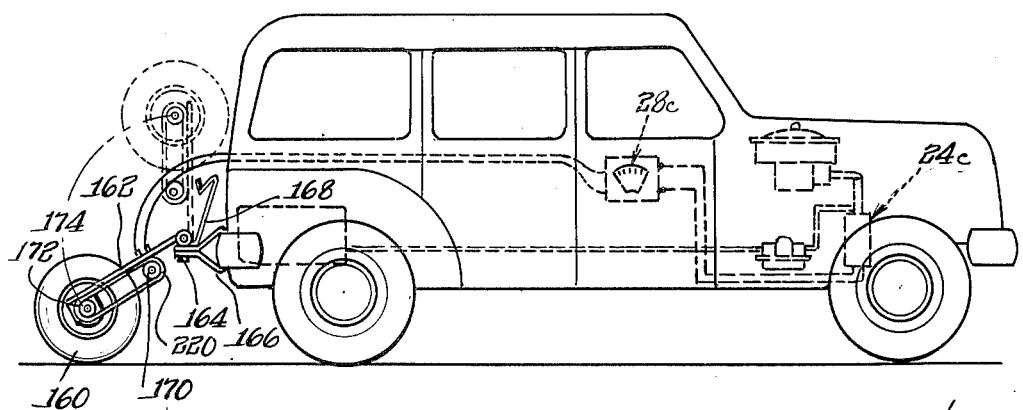
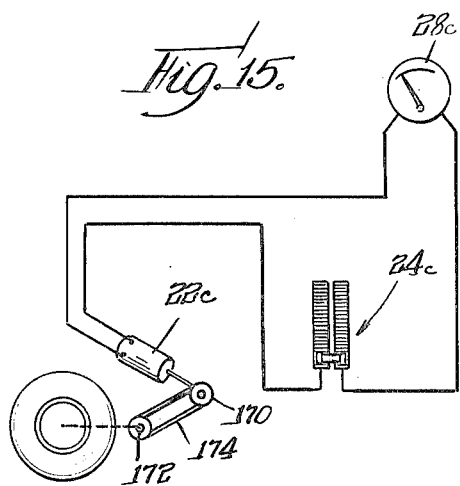
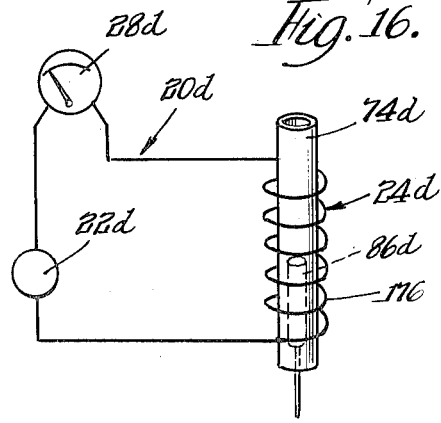
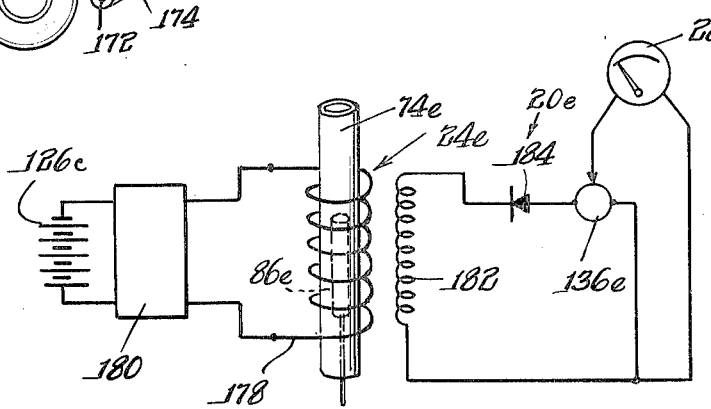

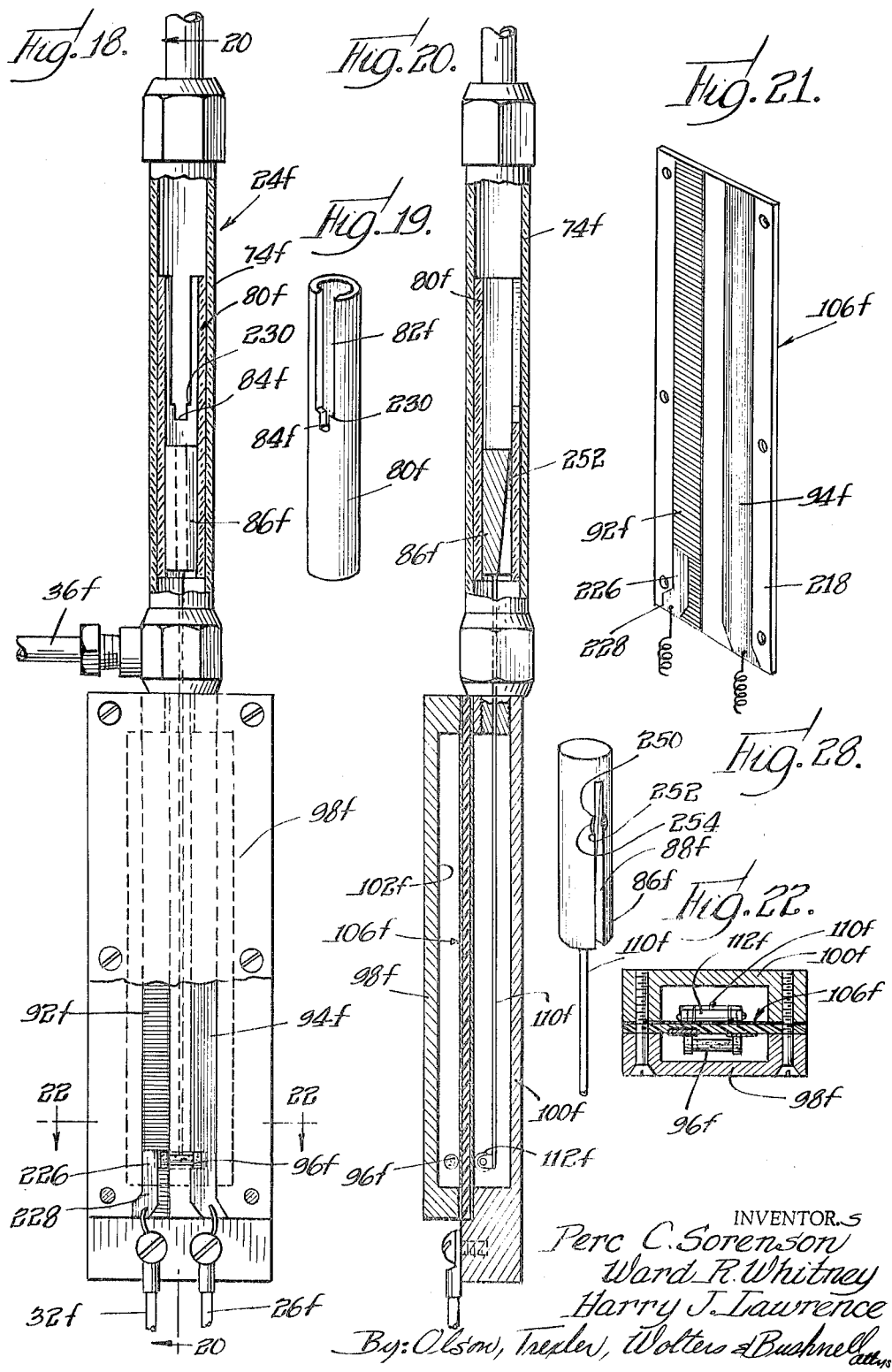

May 31, 1966 P. C. SORENSON ETAL 3,253,459
MILES PER GALLON METER
Filed Oct. 16, 1961 6 Sheets-Sheet 6
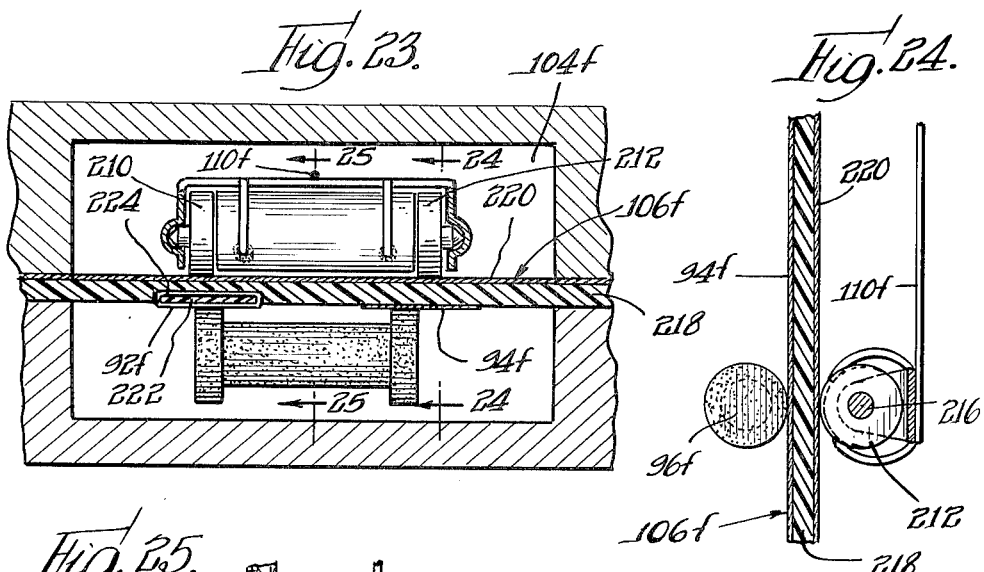
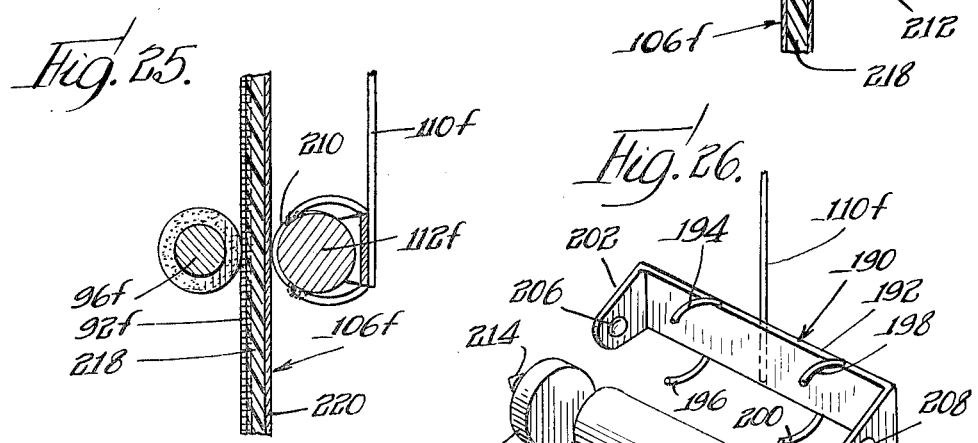
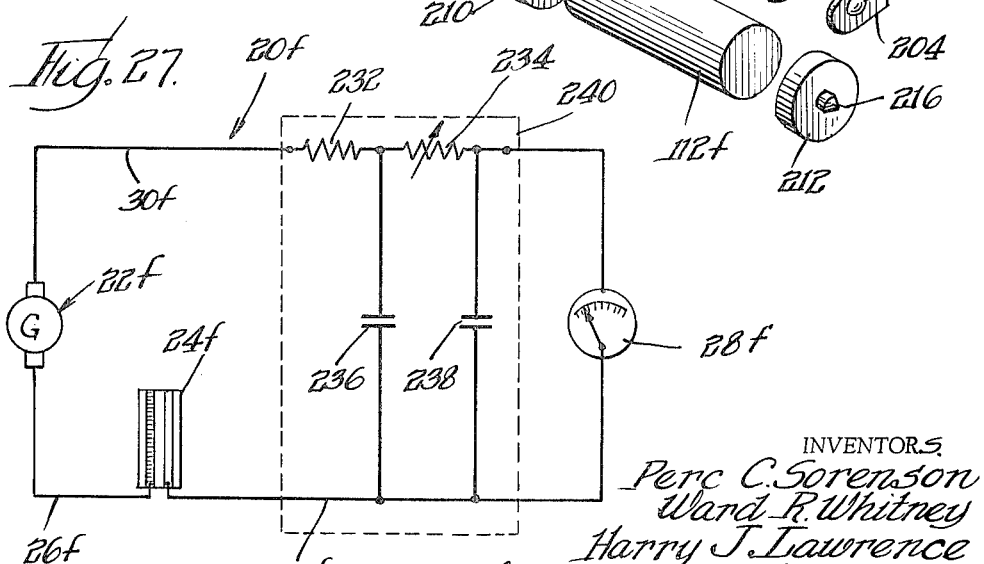
INVENTORS
Perc C. Sorenson
Ward R. Whitney
Harry J. Lawrence
By: Olson, Trexler, Wolters & Bushnell
attys.

United States Patent Office 3,253,459
Patented May 31, 1966

3,253,459
MILES PER GALLON METER
Perc C. Sorenson, Wauwatosa, Harry J. Lawrence, Milwaukee, and Ward R. Whitney, Wauwatosa, Wis.; said Lawrence and said Whitney assignors to said Sorenson
Filed Oct. 16, 1961, Ser. No. 145,114
13 Claims. (Cl. 73—114)

This application is a continuation-in-part of our copending application Serial No. 826,251 filed July 10, 1959, now abandoned.

The present invention relates to a novel instrument or apparatus for testing the efficiency of an engine of a vehicle, and more specifically the present invention relates to a novel instrument for checking the operation of a vehicle as to miles traveled per gallon of fuel consumed.

There are many instances when truck or automobile operators would like to determine the efficiency of the engine of their vehicle or, in other words, the miles of travel which may be obtained per gallon of fuel consumed. In addition, service station or garage mechanics encounter many occasions when it would be desirable quickly to check the engine efficiency of the vehicles on which they have been working. Certain tests may be conducted in a shop, but such tests are generally not the equivalent of actual road tests since they do not provide for actual driving conditions such, for example, as wind resistance, tire slippage, uneven terrain and the like. Miles per gallon instruments have heretofore been suggested for installation on the vehicles to permit testing thereof during normal operation on the highways, but such proposed devices have usually been too expensive, unduly difficult to install or not sufficiently reliable.

It is an important object of the present invention to provide a novel apparatus or instrument which may be easily and quickly either permanently or temporarily mounted on a vehicle so as to enable an operator to obtain a miles per gallon determination rapidly and accurately during operation of the vehicle along a highway.

Another important object of the present invention is to provide a novel miles per gallon apparatus or instrument which is relatively accurate and which, at the same time, may be relatively economically manufactured and installed so that it is both functionally and economically practical.

A more specific object of the present invention is to provide a novel device useable for measuring fuel flow in an apparatus of the type contemplated herein and also useable for measuring or providing a response to the flow of fluid in other types of apparatus, which device is both accurate and of economical construction.

A further specific object of the present invention is to provide a novel device of the type mentioned in the preceding paragraph, which device is constructed for adjusting an electrical component in accordance with the flow of fluid, which electrical component is completely isolated from the fluid whereby the device may be safely used with the gasoline or other inflammable fluids.

A further specific embodiment of the present invention is to provide a novel miles per gallon apparatus or instrument utilizing electrical energy and including means which may be installed on a vehicle without using any special adaptors or equipment for generating electrical energy in response to engine or vehicle speed.

Still another object of the present invention is to provide a novel miles per gallon apparatus or instrument which is constructed so as to utilize actual vehicle speed rather than engine speed as a factor in determining miles per gallon so that the determination will even more accurately reflect the operating efficiency of the vehicle.

A further object of the present invention is to provide a novel substantially frictionless variable resistance unit especially suitable for use in a miles per gallon apparatus or other fluid flow measuring installations so as to obtain improved accuracy and ease of operation. Another specific object of the present invention is to provide a novel miles per gallon apparatus which is electrically operated and which is constructed so as to provide substantially instantaneous readings while at the same time minimizing undesirable fluctuations in the readings. Another specific object of the present invention is to provide a novel miles per gallon apparatus and a novel fluid flow measuring unit therefor, which apparatus and unit are of relatively simple and economical construction and at the same time are adapted to function lineally with respect to variations in the miles per gallon and fuel flow so as to facilitate reading of the apparatus.

Other objects and advantages of the present invention will become apparent from the following description and the accompanying drawings wherein:

FIG. 1 is a simplified view showing a miles per gallon instrument incorporating features of the present invention installed on a vehicle;

FIG. 2 is a diagrammatic view of a miles per gallon instrument incorporating features of the present invention;

FIG. 3 is an enlarged fragmentary view partially broken away showing electrical energy generating means of the installation of FIG. 1 in greater detail;

FIG. 4 is an exploded perspective view showing a subassembly of fluid flow responsive means constructed in accordance with a feature of the present invention;

FIG. 5 is a view similar to FIG. 4 but shows a slightly modified form of the present invention;

FIG. 6 is an enlarged elevational view partially broken away showing a flow measuring or responsive device constructed in accordance with a feature of the present invention;

FIG. 7 is a sectional view taken along line 7—7 in FIG. 6;

FIG. 8 is a fragmentary sectional view taken along line 8—8 in FIG. 6;

FIG. 9 is an exploded perspective view showing a portion of the device of FIG. 6;

FIG. 10 is an enlarged partial sectional view taken along line 10—10 in FIG. 6;

FIG. 11 is a simplified view showing an apparatus or instrument incorporating a modified form of the present invention installed in a vehicle;

FIG. 12 is an enlarged perspective view showing a portion of the instrument of FIG. 11;

FIG. 13 is a diagrammatic view of the instrument of FIGS. 11 and 12;

FIG. 14 shows a miles per gallon instrument or apparatus incorporating another modified form of the present invention installed on a vehicle;

FIG. 15 is a diagrammatic view of the instrument of FIG. 14;

FIG. 16 is a diagrammatic view showing an apparatus embodying another modified form of the present invention;

FIG. 17 is a diagrammatic view showing a further embodiment of the present invention;

FIG. 18 is an elevational view partially broken away showing a fluid or fuel flow sensing unit incorporating another embodiment of the present invention;

FIG. 19 is a perspective view of an element of the unit shown in FIG. 18;

FIG. 20 is a partial sectional view taken generally along line 20—20 in FIG. 18;

FIG. 21 is a perspective view showing a divider and electrical resistance means utilized in the unit of FIGS. 18 and 20;

FIG. 22 is a sectional view taken along line 22—22 in FIG. 18;

FIG. 23 is an enlarged fragmentary sectional view similar to FIG. 22 but showing portions of the structure in greater detail;

FIG. 24 is a fragmentary sectional view taken along line 24—24 in FIG. 23;

FIG. 25 is a fragmentary sectional view taken along line 25—25 in FIG. 23;

FIG. 26 is an exploded perspective view showing a magnet and roller assembly utilized in the unit of FIGS. 18 and 20;

FIG. 27 is a schematic wiring diagram of a miles per gallon apparatus incorporating a modified form of the present invention; and FIG. 28 is an elevational view showing a float member of slightly modified construction.

Referring now specifically to FIGS. 1–4 and 6–10, an apparatus or miles per gallon instrument 20 is shown which comprises a generator 22 for creating electrical voltage or energy in response to engine or vehicle speed, a device 24 responsive to fuel flow to an engine and connected with the generator by a wire 26, and a meter 28 connected with the generator and the device 24 by wires 30 and 32 respectively for responding to the electrical energy provided by the generator 22 and modified by the device 24 and thereby providing an indication of engine efficiency or miles per gallon. As indicated in FIG. 1, the meter 28 which, in the embodiment shown, is a milliamperes meter may be mounted at an convenient location such as a dashboard 34 of a vehicle. The flow responsive device 24 is connected in the fuel line 36 of the vehicle engine 38 between the fuel pump 40 and carburetor 42. The generator 22 which, in the embodiment shown, is a small D.C. generator, is connectable with drive means for a standard speedometer 44 in the manner described below.

As shown in FIGS. 1 and 3, the speedometer is adapted to be driven by means of a drive cable 46 connected to a power take off fitting 48 of the engine transmission 50 in a known manner. In the embodiment shown, the speedometer 44 includes a drive shaft having a socket portion 52 which, in the absence of the structure of this invention, is adapted to receive a noncircular or rectangular end fitting 54 of the flexible drive cable for providing a driving connection between the speedometer and the cable. As will be understood, a similar driving connection is provided between the cable and the power take off of the engine transmission.

In accordance with the present invention, the small generator 22 is constructed so that it may be connected and driven either between the transmission power take off and the flexible drive cable or between the cable and the speedometer. The latter installation is shown in FIGS. 1 and 3 since it may be accomplished very easily and in many instances will be preferred. In order to permit such installation, the generator includes housing means 56 having an internally threaded socket portion 58 at one end thereof for receiving a threaded nipple 60 extending from the housing of the speedometer. The generator housing also includes, at its opposite end, an externally threaded nipple 62 which is substantially identical to the nipple 60 and is adapted to accommodate an internally threaded fitting 64 secured to a flexible guide conduit or sheath 66 which houses the drive cable 46. It is also important to note that the generator includes a rotor shaft 68 having a noncircular or rectangular end portion 70 for cooperative engagement with the socket element 52 of the speedometer. The generator rotor shaft 68 also comprises an opposite end portion 72 having a socket element similar to the socket element 52 for receiving and cooperating with the terminal 54 of the drive cable. With this arrangement, it will be appreciated that the generator may be quickly and easily installed in the vehicle without any need for providing special drive means therefor.

In accordance with an important feature of the present invention, the device 24 is constructed as shown in FIGS. 4 and 6–10 so that it may be economically produced and so that it will efficiently and accurately respond to variations in fluid flow. More specifically, the device 24 includes a tube 74 having end fittings 76 and 78 connected with opposite ends thereof and connected between portions of the fuel line 36. In this embodiment an orifice tube 80 shown in FIGS. 4, 6 and 8, fits snugly within and is fixed with respect to the outer tube or shell 74. The tube 80 is provided with an elongated slot or orifice 82 extending from an end thereof which is downstream with respect to the direction of fluid flow through the device. The slot 82 extends so that an inner end 84 thereof is located at a midportion of the tube 80 for the purpose to be described. A float member 86 closely but freely slidably fits within the tube 80. The tube 80 and the float member 86 are constructed to provide variable orifice means bypassing the float in order to permit the flow of fuel to the tube 80 and also in order to position the float member 86 in accordance with the rate of fuel flow. In accordance with an important feature of the present invention this variable orifice means is provided by a simple and economical construction. More specifically, in this embodiment, the float member 86 is provided with a narrow axially extending peripheral slot 88 having a bottom surface which gradually increases in depth from its upper or downstream end to the lower or upstream end of the float.

The tube 80 and the float member 86 are proportioned and positioned so that when there is no fuel flow, the float normally assumes the lower or retracted position shown in FIG. 6 at which the upper end of the float is substantially at or beneath the lower end 84 of the slot 82 so that the variable orifice means provided by the slot 82 and the slot 88 is substantially closed. Then upon commencement of fuel flow, the float 86 is raised by fluid pressure so that at least a portion of the variable depth slot 88 projects above the lower end of the slot 82 to open the variable orifice means. It will be appreciated that the effective size of the variable orifice means is determined by the distance of the inclined bottom 90 of the slot 88 from the inner surface of the tube 88 at the edge of the lower end 84 of the slot 82. It will further be appreciated that the float member 86 will rise and fall in accordance with change in the rate of fluid flow in order to adjust the size of the variable orifice means to a value which results in a fluid pressure sufficient to balance the weight of the float member. Furthermore, the inclination of the substantially straight bottom surface 90 of the slot 88 is such that the position of the float member 86 will vary lineally with respect to changes in the rate of fluid flow. It will be noted that the portion of the tube 80 above the lower end 84 of the slot 82 could, under certain circumstances, be eliminated, but in the embodiment shown this portion of the tube serves as a guide for the float member when the float member is in a raised position.

Reference is made to FIG. 5 which shows tube and float elements similar to those shown in FIG. 4 as indicated by the application of identical reference numerals with the suffix "a" added to corresponding elements. However, this figure represents a slightly modified form of the present invention in which the variable orifice means is provided by forming the slot 88a having the inclined bottom surface 90a in the tube 80a. In this embodiment the float member 86a is solid. This structure functions in substantially the same manner as the elements of FIG. 4 but, in certain instances, it may be somewhat more difficult to form the tapering slot along the interior of the tube rather than along the exterior of the float.

As shown in FIGS. 6–10, the flow responsive device 24 comprises means controlled by movement of the float member 86 for modifying the electrical energy created by the generator 22 in a manner which enables the meter 28 to provide an indication of miles per gallon. More specifically, this means comprises a pair of electrical resistance elements or coils 92 and 94 adjustably connected with each other by a movable contact element 96 which will be described in detail below. The resistance elements combine together to provide a variable resistance which is connected in series between the generator 22 and the meter 28 by the wires 26 and 32. The resistance elements are mounted within and enclosed by complementary housing members 98 and 100 respectively having channels 102 and 104 therein. These channels are separated and sealed from each other by a centrally disposed divider web or sheet 106 along which the resistance elements extend. It is to be noted that the housing members 98 and 100 and the divider 106 are formed from any suitable non-magnetic material for the purpose described below.

In accordance with another feature of the present invention simply yet highly efficient means is provided for shifting the movable contact element 96 in accordance with movement of the float member while at the same time all passageways of the device containing fluid or fuel are sealed from the resistance elements so as to eliminate any possibility of the occurrence of a fire or an explosion. More specifically, the fitting 76 has a portion 108 extending through an end wall of the housing member 100 and communicating with the channel 104 whereby communication is established between the channel 104 and the tube 80. An elongated narrow wire 110 is fixed to the float member 86 for movement therewith, which wire is also fixed at its lower end to an elongated permanent magnet 112. As shown in the drawings and particularly in FIGS. 7, 8 and 10, the magnet 112 substantially traverses the elongated parallel resistance elements 92 and 94 and is also disposed substantially perpendicularly to the longitudinal axes of the resistance elements. The movable contact element 96 is also formed from magnetic material which is permanently magnetized so that the movable contact 96 is strongly attracted to and retained in a predetermined position by the magnet 112. Thus as the magnet 112 moves up and down with the float 86, the movable contact element 96 is adjusted along the resistance elements. The elongated magnet 112 which is confined within the channel 104 so that it cannot turn about the axis of the wire 110 also serves to prevent the float 86 from turning so that the slot 88 is maintained in alignment with the slot 82 in the tube 80.

As indicated in FIGS. 6–8 and 10, the magnetic movable contact element 96 is round in transverse cross-section so that it will roll rather than slide along the resistance elements. This feature facilitates adjustment of the contact element and promotes accurate and rapid response to movement of the magnet 112. Furthermore, the movable contact element 96 includes enlarged cylindrical end portions 114 and 116 which are axially relatively short so as to provide for more precise electrical contact between the element 96 and the resistance elements 92 and 94. In order further to improve the electrical contact between the element 96 and the resistance elements 92 and 94, the element 96 is coated or plated with copper or any other suitable good electricity conducting material. This plating which may conveniently be applied to the entire surface of the magnetic material of the element 96 is indicated in exaggerated form by the numeral 118 in FIG. 8.

As indicated above, the variable orifice means of the tube 80 and the float 86 is formed so that the position of the float will vary lineally in accordance with changes in the rate of fluid or fuel flow. In addition, the resistance elements 92 and 94 are formed so that the combined resistance provided thereby will vary lineally in accordance with changes in the position of the element 96 or, in other words, in accordance with changes in the rate of fuel flow. The generator 22 is also constructed so that the electrical energy created thereby varies lineally in accordance with changes in speed. Thus, the meter 28 which is of known construction will respond so that an indicating pointer 120 thereof will move increments which vary lineally in accordance with changes of either speed or fuel flow. Thus the meter 28 may be provided with a scale 122 calibrated lineally throughout its range for cooperating with the pointer 120 to provide an operator with an easily readable indication of miles per gallon.

FIGS. 11, 12 and 13 show an apparatus or instrument 20b which is similar to the structure described above as indicated by the application of identical reference numerals with the suffix "b" added to corresponding elements. Certain features of this embodiment which will be described in detail below make it especially suitable for use as a temporary installation by mechanics for the purpose of testing in a vehicle on which they are working. In this embodiment the above described speed responsive generating means is replaced by means for providing a predetermined constant amount of electrical energy which has previously empirically been determined to be equal to the energy provided by the above described generator 22 when the vehicle is driven at a given speed. This means is, however, manually adjustable so that the energy provided thereby will correspond to the energy which would be created by the generator 22 when the vehicle is driven at various different speeds. This enables the vehicle to be tested for miles per gallon or efficiency when it is driven at such predetermined speeds.

Referring more specifically to FIGS. 11, 12 and 13, it is seen that the apparatus 20b comprises a housing 124 which may be temporarily placed at any convenient location in the vehicle. The meter 28b is mounted within the housing 124, and the aforementioned means for providing the energy is also located within the housing. This means comprises one or more batteries 126 connected by wires 128 and 130 to terminals 132 and 134 of a potentiometer 136. Preferably, a switch 138 is provided in the wire 128 so that the circuit may be opened when the apparatus is not in use. A movable contact 140 of the potentiometer is connected with one terminal of the meter 28b by a wire 142 and also with the terminal or a double pole double throw switch 144 by means of a wire 146. The other terminal 148 of the meter 28b is connected by wire 150 to another terminal of the switch 144. The variable resistance means of the device 24b has one terminal connected by means including wire 152 to the terminal 134 of the potentiometer, and another terminal of the variable resistance means is connected with the switch 144 in the manner shown. The arrangement is such that when the switch 144 is in the condiiton shown, the variable resistance means of the device 24b is ineffective whereby the reading obtained on the meter 28b may be controlled solely by adjusting the potentiometer 136. Such a reading will correspond to a theoretical rate of travel of the vehicle and therefore the meter 28b is provided with a scale 154 in addition to the miles per gallon scale 122b, which scale 154 represents miles per hour.

In order to test a vehicle with the apparatus 20b, the potentiometer is adjusted until the pointer 120b reaches any desired miles per hour mark on the scale 154. Then the operator drives the vehicle until the speedometer 44b indicates that the vehicle is traveling at the preselected speed whereupon the double throw switch 144 is shifted to the position opposite from that shown so that the variable resistance of the device 24b becomes effective for modifying the electrical energy provided by the power source and the meter 28b functions to indicate miles per gallon.

FIGS. 14 and 15 show another embodiment of the present invention which is similar to the structures described above as indicated by the application of identical reference numerals with the suffix "c" added to corresponding elements. This embodiment is also especially useful as a temporary installation for the purposes of checking a vehicle. This embodiment has an advantage for special testing purposes over the structure of FIG. 1 in that the generator 22c is driven more precisely in accordance with the actual speed of the vehicle. This is accomplished by driving the generator from an auxiliary wheel 160 pulled behind the vehicle during the testing operation. As indicated in FIG. 14, the wheel 160 is rotatably mounted at an outer end of a pivoted arm structure 162 connected by pivot means 164 to a bracket 166 temporarily secured to the bumper of the vehicle. A suitable latch member 168 is provided for maintaining the auxiliary wheel in the elevated broken line position shown in FIG. 14 until the testing operation is to take place. The generator 22c is mounted on the arm structure and carries a pulley 170 at an end of its armature shaft, which pulley is driven from a pulley 172 on the wheel shaft by an endless belt 174.

FIG. 16 shows an apparatus 20d embodying another form of the present invention. In this embodiment, an A.C. generator 22d is provided which generator may be driven in the manner shown either in FIGS. 1 or 14. The flow responsive device 24d of this embodiment incorporates a tube and float assembly having variable orifice means essentially identical to the corresponding elements described above. However, in this embodiment the device 24d is provided with a wire coil 176 wound around the tube 74d. The coil 176 is connected in series with the generator 22d and the meter 28d so that as the iron or steel float 86d changes position within the coil in accordance with fuel flow, the meter indicates the correct miles per gallon.

FIG. 17 shows an apparatus 20e which may be used for testing a vehicle for miles per gallon. In this embodiment, the iron or steel float 86e of the flow responsive device 24e is associated with a primary coil 178 of a transformer, which coil is connected with an oscillator 180 which in turn is connected with a power source or battery 126e. Thus electrical energy is generated in a secondary coil 182 of the transformer in accordance with the rate of fuel flow, which energy may be converted to direct current by a suitable diode rectifier 184. The transformer is connected with a potentiometer 136e which is calibrated so that it may be set to provide a predetermined resistance corresponding to a predetermined vehicle speed so that the meter 28e will function to indicate miles per gallon when the vehicle is driven at the predetermined speed.

FIGS. 18 through 28 show an embodiment of the present invention similar to the structures described above as indicated by the application of identical reference numerals with the suffix "f" added to corresponding elements. One important difference in this embodiment is that the flow responsive device 24f is constructed so as further to minimize friction between moving parts therein and thereby promote smoother and more efficient operation thereof. In this connection attention is particularly directed to FIGS. 23–26. As shown best in these figures, the magnet 112f is connected to a cage or bracket member 190 which in turn is soldered or otherwise connected to the rod 110f. The cage member 190 includes an elongated body portion 192 which extends along one side of the magnet and projects beyond opposite ends thereof. Pairs of fingers 194–196 and 198–200 extend from the cage body portion 192 in embracing relationship with respect to the magnet. These fingers are soldered or otherwise secured to the magnet.

The cage member 190 is provided with tabs 202 and 204 extending laterally from opposite ends thereof and substantially traversing opposite ends of the magnet 112f. The tabs 202 and 204 are spaced axially from the opposite ends of the magnet and are respectively provided with central socket portions 206 and 208. Small wheels 210 and 212 are respectively trapped between the opposite ends of the magnet 112f and the tabs 202 and 204. These wheels include short axially extending stub shafts 214 and 216 which respectively enter the sockets 206 and 208 so that the wheels are rotatably supported. As shown best in FIGS. 23–25, the wheels are located so as to roll along one surface of the divider 106f and so that sliding frictional contact between the divider and the magnet 112f is eliminated. The elimination of sliding frictional contact between the magnet and the divider promotes smoother and freer operation of the flow sensing unit.

In this embodiment the divider 106f is provided with a main sheet like body 218 of plastic or other suitable electrical inflating material. A thin coating or sheet 220 is applied to the side of the body 218 facing the gasoline or fuel chamber 104f. The sheet or coating 220 is made from a suitable material which may, for example, be copper or other metal for protecting the body portion 218 from the gasoline or fuel and for providing a hard smooth bearing surface on which the wheels 210 and 212 may easily be rolled.

The electrical element 94f located at the side of the body 218 opposite from the sheet 220 is preferably provided in the form of a printed circuit strip of suitable material such as copper or other electrically conducting metal. Element 92f, on the other hand, is preferably provided by winding a suitable resistance wire around an elongated card 222 which is then adhesively or otherwise fixed within a groove 224 formed in the body 218 so that the surface of the resistance element 92f is substantially coplanar with the surface of the printed circuit strip 94f.

As shown in FIGS. 18, 20 and 21, the resistance element 92f and the printed circuit element 94f extend so as substantially to traverse the length of the chamber 102f and more specifically so as to extend for the full range of travel of the contact element 96f. Thus, the contact element engages the same type of surface throughout its travel so as to promote smooth and uniform movement. However, it is to be noted that a plurality of the coils of the resistance of element 92f at the lower end of the resistance element are shorted together by suitable means 226. The means 226 may be provided by a suitable electricity conducting paint or by a suitable metallic strip. In any event, the means 226 is electrically joined to a short printed circuit element 228 which extends for connection with the wire 32f. An end portion of the circuit element 94f similarily extends for connection to the wire 26f. It it to be noted that the means 226 extends only along one margin of the resistance element 92f so as to avoid interference with the rolling contact element 96f.

In this embodiment the tube 80f is modified so as to promote easier flow of the fuel after the fuel passes the restricted orifice. In order to accomplish this, the slot 82f is widened at 230 a short distance above the orifice defining edge 84f.

The miles per gallon apparatus 20f shown schematically in FIG. 27 is constructed so as further to improve the efficiency and linear indication of the miles per gallon. Thus, the generator 22f is constructed so that its output varies lineally with speed and the resistance of the unit 24f and more specifically, the resistance of the element 92f varies lineally with respect to movement of the contact 96f. In addition, the meter 28f is calibrated so as to provide a lineal scale.

It is to be noted that the generator 22f and the meter 28f ecah have their own internal resistances which combine to provide the circuit with a fixed minimum resistance. Thus, the reading provided by the meter 28f is controlled in part by this fixed minimum resistance which is added to the variable resistance provided by the unit 24f. This fixed resistance tends to cause unacceptable errors in the reading of the apparatus particularly when the flow rate of the fuel is low, for example, less than about one-half gallon per hour, so that the resistance provided by the unit 24f is low. In order to eliminate such errors, the aforementioned means 226 of the unit 24f is located so that its upper edge terminates at the position the rolling contact 96f would occupy when fuel is flowing at a rate for shifting the contact element along the resistance element 92f a distance corresponding to the aforementioned fixed minimum resistance. In other words, the upper edge of the means 226 is located above the lowermost position of the rolling contact element 96f a distance such that the resistance of the element 92f along said distance would be equal to the aforementioned minimum fixed resistance of the circuit in the absence of the shorting element or means 226.

In a preferred form of the invention, the electrical circuitry of the apparatus is such that the aforementioned minimum fixed resistance is sufficient to minimize any possibility of injury to the meter unit 28f when the fuel flow is at a very low value or is stopped, and means is included for providing a damping effect so that the apparatus will provide a smooth and relatively steady reading and will not be unduly affected by road shocks, vibrations and the like when installed in a vehicle. More specifically, the apparatus as shown in FIG. 27 includes series connected resistance elements 232 and 234 in the wire 30f between the generator and the meter unit 28f. In addition, capacitors 236 and 238 are connected in parallel between the wires 30f and 32f. The capacitor 236 is connected to the wire 30f at a point between the resistors 232 and 234 while the capacitor 238 is connected to the wire 30f at a point between the resistor 234 and the meter unit 28f.

The resistance elements 232 and 234 will, of course, provide a portion of the minimum fixed resistance of the system. Thus, in this embodiment, the minimum fixed resistance of the apparatus will include the sum of the resistances of the generator 22f, the meter unit 28f and the resistors 232 and 234 and the upper end of the element 226 or, in other words, the effective starting point of the resistance element 92f should be located accordingly. The resistor 234, as indicated in the schematic drawing, may be variable so as to aid in initially calibrating the apparatus. However, after the initial adjustment has been partially made, the resistor 234 will remain fixed. Of course the variable resistor 234 could be replaced with a fixed resistor having the desired value. It is contemplated that the resistors 232 and 234 and the capacitors 236 and 238 will be mounted in a simple container or box 240, which box may be easily positioned at any desired location within the vehicle on which the apparatus is installed. For example, the box may be readily mounted beneath the dashboard of an automobile.

While the area of a given cross-section of the slot 88a in the float 86a varies substantially lineally in accordance with the depth of the slot, a slight error in the calculated area as compared with the actual results from the fact that the outer surface of the float is curved. This error is of no practical significance toward the deeper end of the slot. However, the error increases to a significant amount toward the shallow end of the slot. When the fuel flow is relatively low, for example, between one-half and one gallon per hour, the shallow end portion of the slot traverses the orifice edge 84f. In order to minimize or eliminate the error during such low rates of fuel flow, the float is provided with a transverse recess 250 intersecting the slot adjacent to, but spaced from the shallow end of the slot. The recess is rounded or otherwise formed progressively deeper from point 252 to point 254 for progressively widening and increasing the area of the slot and thereby compensating for the increased percentage of error which would otherwise be present because of the curved periphery of the float.

There is also a possibility of an error arising in the linearity of the float movement, particularly when the flow starts from a zero amount, as a result of fluid turbulence arising from a change in the flow rate and the effect of inertia on the movement of the float. The recess 252 also serves to minimize or eliminate this error.

In the embodiment shown, the shallow portion of the slot between the point 254 and the adjacent end of the slot would be positioned at the orifice edge only when the fuel flow is less than about one-half gallon per hour. Thus, the aforementioned errors when this portion of the slot is located at the orifice edge may be disregarded since, as discussed above, the apparatus is constructed so as to provide a reading only when the fuel flow exceeds one-half gallon per hour.

This invention is claimed as follows:

1. In a miles per gallon apparatus, the combination comprising an electrical circuit, generator means connectable in a vehicle speedometer drive for causing electricity to flow in said circuit in accordance with a speed factor, electrical meter means in said circuit for indicating miles per gallon, tube means connectable in a vehicle fuel line and having an elongated upstanding portion of substantially uniform diameter throughout and a fuel inlet and a fuel outlet above said inlet, float means including an elongated element of substantially uniform diameter throughout its length slidably disposed movable in said tube means portion between the inlet and outlet and from a starting position and in accordance with fuel flow, said tube means portion and float element including cooperable means providing an orifice varying in size in accordance with position of said float element, said float means including an element of magnetic material, means external of and sealed from the interior of said tube means and including a lineally variable resistance element and a movable magnetic contact element cooperable therewith electrically connecting said meter means and said generator means, sealed imperforate wall means between said resistance element and contact element and said interior of said tube means, said contact element being magnetically coupled to and movable with said float means element for modifying the flow of electricity in said circuit in accordance with fuel flow, said circuit having a predetermined minimum resistance, and said variable resistance element having an effective starting point located for engagement by said contact element when the float means is spaced from said starting point a predetermined distance, said distance being such that if the float means were shifted still further away from said starting position a similar distance, the total resistance in said circuit will be substantially double said predetermined minimum resistance.

2. In an apparatus for determining the efficiency of a fuel consuming device having variable output and variable fuel consumption, the combination of an electrical circuit, means responsive to a variable output factor of said device for providing a flow of electricity in said circuit, means for providing an upstanding portion of a fuel line having an inlet and an outlet above said inlet and a chamber communicating with said line, means in said fuel line movable in response through flow of fuel to said fuel line, sealed and imperforate wall means defining and sealing one side of said chamber, said means movable by the flow of fuel including an element of magnetic material movable along said wall means in said chamber, and anti-friction means engageable with said wall means and supporting said element, means external of said fuel line and said chamber and including a variable resistance element disposed along a surface of said wall means opposite from said chamber, a magnetic contact element magnetically coupled with and movable with said first mentioned element and engageable with said resistance element for modifying the flow of electricity in said circuit in accordance with the flow of fuel, and means connected in said circuit and responsive to said modified flow of electricity therein for indicating the efficency of said device.

3. An apparatus, as defined in claim 2, wherein said contact element is a permanent magnet having a round transverse cross section for enabling it to roll along said resistance element.

4. In an apparatus for determining the efficiency of a fuel-consuming device having variable output and variable fuel consumption, the combination of an electrical circuit, means responsive to the variable output of said device for providing a flow of electricity in said circuit in relation to said output, a fuel system including a fuel line leading to said device comprising a generally upstanding portion of substantially uniform internal diameter throughout its length, said fuel line portion having a fuel inlet and a fuel outlet above said inlet and being completely sealed from the surrounding atmosphere, float means including an element having a substantially constant diameter similar to said internal diameter and being freely axially slidably disposed within said fuel line portion, said fuel line portion being adapted to be completely filled with fuel, said float element and said fuel line portion comprising cooperable means defining a restricted orifice variable in size in accordance with movements of said float element for enabling the float element to be positioned in accordance with the rate of fuel flow through said fuel line portion and said orifice, variable resistance means comprising a resistance element and a movable contact disposed adjacent to and completely outside of and sealed from the interior of said fuel line portion and connected in said circuit for modifying the flow of electricity in said circuit, said movable contact including a magnetic element, said float means comprising a magnetic element within said fuel system and magnetically coupled with said first mentioned magnetic element for moving said contact in accordance with the position of said float means, and said fuel system including sealed and imperforate wall means separating said float means from said variable resistance means.

5. In a miles per gallon apparatus, the combination comprising an electrical circuit, generator means connectable in a vehicle speedometer drive for causing electricity to flow in said circuit in accordance with a speed factor, electrical meter means in said circuit for indicating miles per gallon, tube means connectable in a vehicle fuel line, float means including an element of magnetic material movable in said tube means in accordance with fuel flow, and means external of and sealed from said tube means electrically connecting said meter means and said generator means and including an element magnetically coupled to and movable with said first mentioned element for modifying the flow of electricity in said circuit in accordance with fuel flow to enable the meter means to indicate miles per gallon.

6. In a miles per gallon apparatus, the combination comprising means for generating electrical energy in accordance with vehicle speed, electrical meter means for indicating miles per gallon, upstanding tube means connectable in a vehicle fuel line for being completely filled with fuel, float means including an element of magnetic material movable in said tube means, said float means and tube means defining a variable orifice which changes in effective size upon movement of the float means, said float means being movable in response to variations in fluid pressure accompanying variations in fuel flow, and electrical means external of and sealed from said tube means electrically connecting said meter means and said generating means and responsive to movement of said element for modifying electrical energy provided by said generating means and in accordance with fuel flow for enabling the meter to indicate miles per gallon.

7. A miles per gallon meter, as defined in claim 6, wherein said electrical means comprises first variable resistance means connected between a first pair of terminals of said generating means and said meter means for modifying the electrical energy in accordance with the fuel flow, second and third resistance means connected in series with each other and between a second pair of terminals of said generating means and said meter means, a first capacitor means having one terminal connected between said first pair of terminals and another terminal connected between said second and third resistance means, and a second capacitor means having one terminal connected between said first pair of terminals and a second terminal connected between said third resistance means and said meter means.

8. A flow meter comprising upstanding tube means connectable in a fluid line, a chamber extending in axial alignment with said tube means and defined by imperforate sealed wall means, passage means between said tube means and said chamber and being the only opening into said chamber, said tube means including a cylindrical portion having a substantially uniform diameter throughout its length, cylindrical float means having a substantially uniform diameter throughout its length slidably fitting within said portion of said tube means, said tube means having a fluid inlet below said float means and a fluid outlet above said float means, said float means and said tube means including means providing a variable orifice for enabling the float means to be positioned within the tube means in accordance with fluid flow through the tube means, said float means being substantially solid and said variable orifice means including an elongated variable depth slot of substantially uniform width in said solid float means, an electrical resistance element disposed along an outer side of said chamber and completely separated from and sealed from the interior of the chamber and said tube means, an element of magnetic material within said chamber, means freely extending through said passage means and mechanically connecting said float means and said element, and electrical contact roller means shiftable along said resistance element and magnetically supported by said element whereby said contact roller is shifted in accordance with movement of the float means.

9. A flow meter comprising upstanding tube means connectable in a fluid line, a chamber communicating with and in generally axial alignment with said tube means and defined by wall means, said tube means including a cylindrical portion having a substantially uniform diameter throughout its length, cylindrical float means having a substantially uniform diameter throughout its length slidably fitting within said portion of said tube means, said tube means having a fluid inlet below said float means and a fluid outlet above said float means, said float means and said tube means including means providing a variable orifice for enbling the float means to be positioned within said tube means in accordance with fluid flow through the tube means, an electrical resistance element disposed along an outer side of said chamber wall means, an electrical contact roller element of magnetic material rollable along and in direct contact with said resistance element, an element of magnetic material movable within said chamber, one of said elements of magnetic material being a permanent magnet and said elements of magnetic material being magnetically connected with each other, said magnetic connection providing the sole means supporting said contact element and urging said contact element into engagement with said resistance element, and means extending through said tube means and chamber and mechanically connecting said float means and said second mentioned element of magnetic material and actuating said second mentioned element of magnetic material in unison with said float means.

10. A flow meter, as defined in claim 9 wherein said means providing a variable orifice comprises longitudinally extending slot means in said float means, said slot means being of progressively varying depth and of uniform width substantially throughout its length.

11. A flow meter, as defined in claim 9 wherein both of said elements of magnetic material are permanent magnets.

12. A flow meter, as defined in claim 9, wherein said wall means on which said resistance element is located comprises a thin substantially flat wall member, said elements of magnetic material bearing directly against opposite sides of said thin wall member.

13. An apparatus, as defined in claim 9, which includes a coating of relatively good electricity conducting material covering the magnetic material of the contact element for enhancing electrical contact with the resistance element.

References Cited by the Examiner

UNITED STATES PATENTS

| | | | |
|---|---|---|---|
| 1,158,052 | 10/1915 | Horton | 338—97 |
| 1,276,384 | 8/1918 | Lundy | 338—97 |
| 1,754,039 | 4/1930 | Pawlick et al. | 73—114 |
| 1,917,974 | 7/1933 | Inglis et al. | 73—114 X |
| 2,091,792 | 8/1937 | Niesemann | 73—208 |
| 2,179,418 | 11/1939 | McDonald | 310—75 |
| 2,210,081 | 8/1940 | Humphrey | 73—208 |
| 2,304,822 | 12/1942 | Harrison et al. | 73—114 |
| 2,459,689 | 1/1949 | Dickey et al. | 73—208 X |
| 2,500,216 | 3/1950 | Szekely | 310—75 |
| 2,707,395 | 5/1955 | Morschel. | |
| 3,014,366 | 12/1961 | Faunce | 73—114 |

OTHER REFERENCES

Murphy: Basic Automatic Control Theory, published by Van Nostrand Co., Princeton, N.J. 1957, pp. 68 and 69 relied on.

RICHARD C. QUEISSER, *Primary Examiner.*

ROBERT EVANS, DAVID SCHONBERG,
*Examiners.*

C. I. McCLELLAND, E. D. GILHOOLY,
*Assistant Examiners.*